United States Patent
Yokota et al.

(10) Patent No.: US 8,983,196 B2
(45) Date of Patent: Mar. 17, 2015

(54) VEHICLE PERIPHERY MONITORING APPARATUS

(71) Applicant: DENSO CORPORATION, Kariya, Aichi-pref. (JP)

(72) Inventors: Nobuyuki Yokota, Kariya (JP); Junshi Utsu, Nagoya (JP); Muneaki Matsumoto, Okazaki (JP)

(73) Assignee: DENSO CORPORATION, Kariya (JP)

(*) Notice: Subject to any disclaimer, the term of this patent is extended or adjusted under 35 U.S.C. 154(b) by 169 days.

(21) Appl. No.: 13/727,051

(22) Filed: Dec. 26, 2012

(65) Prior Publication Data

US 2013/0177207 A1 Jul. 11, 2013

(30) Foreign Application Priority Data

Jan. 10, 2012 (JP) .................................. 2012-002362

(51) Int. Cl.
*G06K 9/00* (2006.01)
*G06K 9/78* (2006.01)

(52) U.S. Cl.
CPC .............. *G06K 9/78* (2013.01); *G06K 9/00805* (2013.01)
USPC ....................................................... 382/190

(58) Field of Classification Search
None
See application file for complete search history.

(56) References Cited

U.S. PATENT DOCUMENTS

| | | | |
|---|---|---|---|
| 7,652,559 B2* | 1/2010 | Chinomi et al. | 340/435 |
| 8,605,153 B2* | 12/2013 | Sasaki et al. | 348/148 |
| 2005/0083427 A1 | 4/2005 | Imoto | |
| 2008/0055407 A1* | 3/2008 | Abe | 348/118 |
| 2010/0002081 A1* | 1/2010 | Pawlicki et al. | 348/148 |
| 2011/0128138 A1* | 6/2011 | Yamamoto et al. | 340/436 |
| 2011/0301846 A1 | 12/2011 | Yanagawa et al. | |

FOREIGN PATENT DOCUMENTS

| | | |
|---|---|---|
| JP | 8-083383 A | 3/1996 |
| JP | 2005123968 A | 5/2005 |
| JP | 2008-276308 A | 11/2008 |

OTHER PUBLICATIONS

U.S. Appl. No. 13/739,101, filed Jan. 11, 2013.

* cited by examiner

*Primary Examiner* — Jon Chang
*Assistant Examiner* — Oneal R Mistry
(74) *Attorney, Agent, or Firm* — Posz Law Group, PLC (57) ABSTRACT

A vehicle periphery monitoring apparatus displays a detection line on a display unit, with side portions of the detection line positioned on far-off spots that are farther than a spot on which a center portion of the detection line is positioned. In addition, based on the distance of the respective spots on which the portions of the detection line are positioned, the apparatus includes a parameter table that defines different parameters for a short distance portion, a middle distance portion, and a long distance portion of the detection line. The apparatus detects a moving object based on an actual-detected brightness change of a pixel along the detection line and a predefined brightness change of a pixel along the detection line that is defined by the parameter of the parameter table.

5 Claims, 7 Drawing Sheets

| | | SHORT DIST. AREA | MIDDLE DIST. AREA | LONG DIST. AREA |
|---|---|---|---|---|
| AUTOMOBILE | SIZE W | 70pix | 23pix | 15pix |
| | DISTANCE D (SPEED 30km/h) | 102pix | 19pix | 12pix |
| TWO WHEEL | SIZE W | 34pix | 12pix | 7pix |
| | DISTANCE D (SPEED 15km/h) | 42pix | 8pix | 6pix |
| PEDESTRIAN | SIZE W | 14pix | 6pix | 5pix |
| | DISTANCE D (SPEED 8km/h) | 20pix | 5pix | 2pix |

VEHICLE PERIPHERY MONITORING APPARATUS

CROSS REFERENCE TO RELATED APPLICATION

The present application is based on and claims the benefit of priority of Japanese Patent Application No. 2012-2362, filed on Jan. 10, 2012, the disclosure of which is incorporated herein by reference.

TECHNICAL FIELD

The present disclosure generally relates to a vehicle periphery monitoring apparatus for monitoring a moving object around a vehicle.

BACKGROUND

Conventionally, as disclosed in Japanese Patent Laid-Open No. 2005-110202 (JP '202), a vehicle periphery monitoring apparatus having a wide-angle lens camera is proposed for providing a driver of a subject vehicle with a wider field of view, which has a view angle of at least 180 degrees. Though such an apparatus has a very wide view angle, a trade-off of having a smaller image size for an object captured in a corner/periphery of a captured image cannot be avoided. More practically, when a vehicle backs up, the driver of the subject vehicle, even though staring at the captured image of a rear view of the vehicle, cannot notice/recognize an object captured in the corner of the captured image that is very small, since the driver's attention is naturally drawn to a nearby vehicle parking on the left/right of the subject vehicle with minimum clearance.

Therefore, for example, a monitoring apparatus that emphasizes a moving object on a display unit is proposed in Japanese Patent Laid-Open No. 2005-123968 (JP '968), which emphasizes the moving object after cropping such object from the captured image. In JP '968, the emphasizing scheme of the moving object is disclosed as a calculation of an optical flow of feature points in the captured image and a formation of a motion vector for each of the feature points, enabling a cropping of the moving object from the captured image. The cropped moving object in a dead angle of the subject vehicle is then displayed in an emphasized manner on the display unit, thereby allowing the driver of the subject vehicle to easily notice/recognize such a dangerous object in the dead angle.

However, extraction of the motion vectors from the captured image by processing an image based on a calculation of the optical flow, as provided in JP '968, requires a huge processing load. Thus, an accurate cropping in response to the motion of the moving object may only be enabled by a separate/dedicated processor for having processing results in a timely manner.

Figure 7:
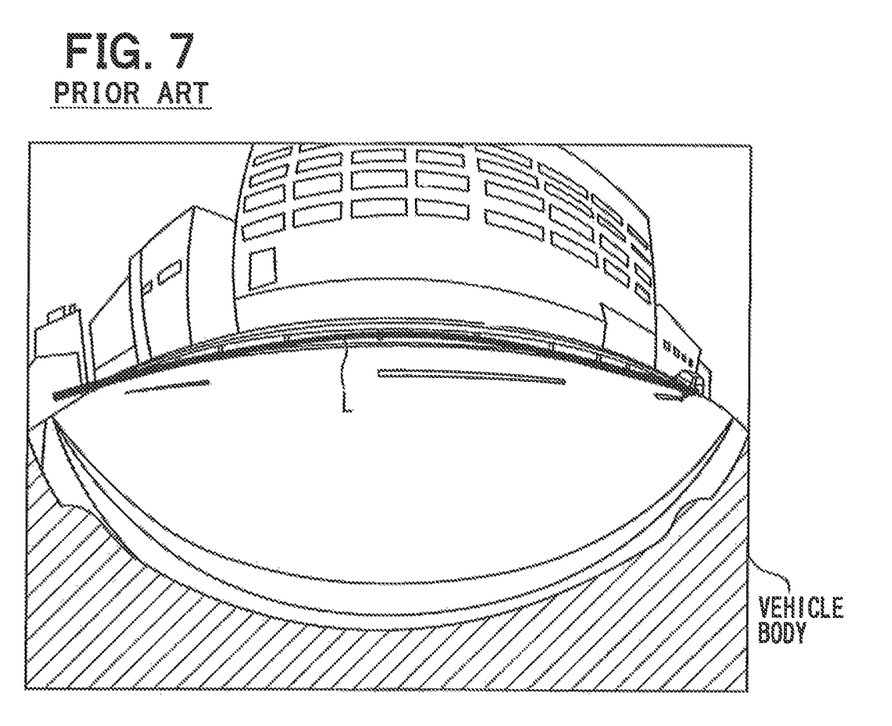
FIGS. 7, 8A, 8B are illustrations of a prior art imaging capturing apparatus.

Therefore, as shown in FIG. 7, in some recently-developed image capturing apparatus, a detection line L extending horizontally in a left-to-right axis is set in the captured image for capturing an outside periphery of the subject vehicle for the detection of the moving object. A detection area for detecting the moving object is narrowed to such detection line L. In particular, the brightness of a pixel along the detection line L changes according to a movement of the moving object.

By pre-defining a parameter representing a pixel along the detection line L, parametric detection of the brightness change of the pixel along the detection line L is enabled for detecting a moving object. Based on a comparison between a parametric definition of pixel's brightness, which serves as a template, and an actually-detected brightness of the pixel that has changed brightness along the detection line, the detection of the moving object is enabled.

However, even when the moving object is moving at a constant speed, the size of the brightness change or the number of pixels that have changed brightness and the amount of movement of such pixels per unit time (i.e., the movement speed) due to the movement of the moving object along the detection line L are different and depend on the position of such movement in the captured image.

Figure 8A:
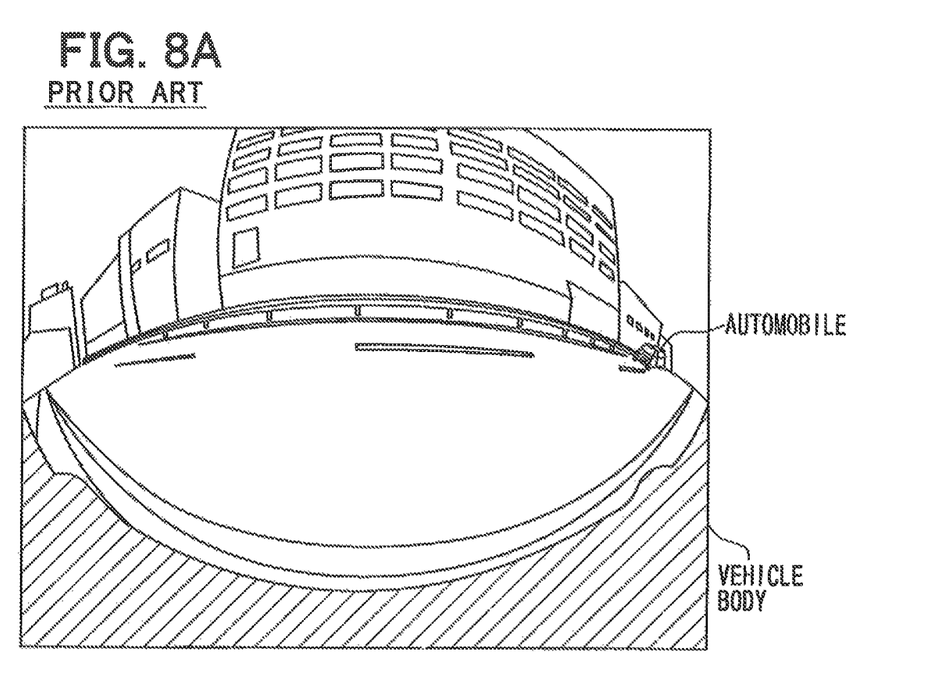
Figure 8B:
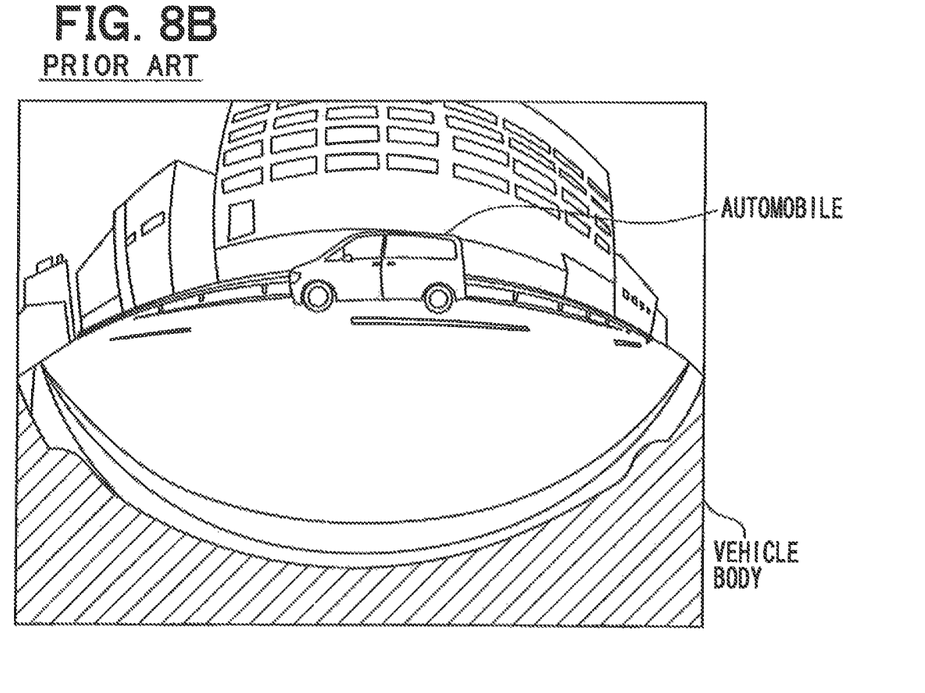

FIGS. 8A and 8B show a captured image by using the wide-angle lens camera, in which an automotive vehicle is traveling from the right side toward the center of the captured image. In FIG. 8A, the vehicle is small in the right corner of the captured image. In FIG. 8B, the vehicle is large at the center of the captured image. Further, the amount of movement of the changing pixel per unit time is greater at the center of the captured image than at the right corner of the image.

However, in the apparatus of JP '968, the parameter representing the brightness change of the pixels along the detection line L (FIG. 7) is defined uniformly for the entire detection line L. Therefore, the apparatus can not accurately detect the moving object in the captured image.

SUMMARY

In an aspect of the present disclosure, a vehicle periphery monitoring apparatus includes a detection unit, a parameter table, and a moving object detector. The detection unit detects a brightness change of a pixel along a detection line. The detection line extends in a right-left axis of a captured image captured by an in-vehicle camera, and the brightness change of the pixel is caused by a movement of a moving object. The parameter table defines a parameter regarding brightness change that is detected along the detection line, as a predefined brightness change of the pixel along the detection line, and the moving object detector detects the moving object.

The detection line has multiple portions that include a center portion at a center of the captured image and side portions at a right and left side of the center portion. In particular, the side portions are positioned on far-off spots farther from the in-vehicle camera relative to a spot on which the center portion is positioned. The parameter table defines a different parameter for each of the multiple portions of the detection line.

The moving object detector then detects the moving object based on the brightness change of the pixel detected by the detection unit and the predefined brightness change of the pixel defined by the parameter table for the multiple portions of the detection line.

The side (i.e., right/left) portions of the detection line positioned in the left area and the right area of the captured image are positioned (i.e., laid or displayed) on top of the far-off spots that are more distant from the in-vehicle camera than a spot on which the center portion of the detection line is positioned (i.e., laid/displayed).

The parameter table defines a different parameter for each of the multiple portions of the detection line, by dividing the detection line into the multiple portions according to camera-to-spot distances of respective spots from the in-vehicle camera. Because the moving object is detected based on the predefined brightness change of the pixel defined by the parameter table for the multiple portions of the detection line, which serves as a "template" or a "gauge" of various moving objects, the evaluation of the brightness change of the pixel detected by the detection unit and the detection of the moving object are performed in an accurate manner.

Such configuration of the vehicle periphery monitoring apparatus improves the accuracy of detecting a moving object and improves the apparatus's ability of monitoring a periphery of the vehicle with further reduction to a process load of the detection calculation.

The various portions of the detection may further be arranged, such that the center portion of the detection line at a center area of the captured image is positioned on a reference position that has a known/constant distance from the in-vehicle camera, and other portions of the detection line are positioned on other spots. In such a case, the other spots, together with the reference position, define a line that is perpendicular to a camera-to-reference-position direction, which is a capturing direction of the in-vehicle camera, looking out towards the reference position.

BRIEF DESCRIPTION OF THE DRAWINGS

Other objects, features and advantages of the present disclosure will become more apparent from the following detailed description disposed with reference to the accompanying drawings, in which.

DETAILED DESCRIPTION

Figure 1:
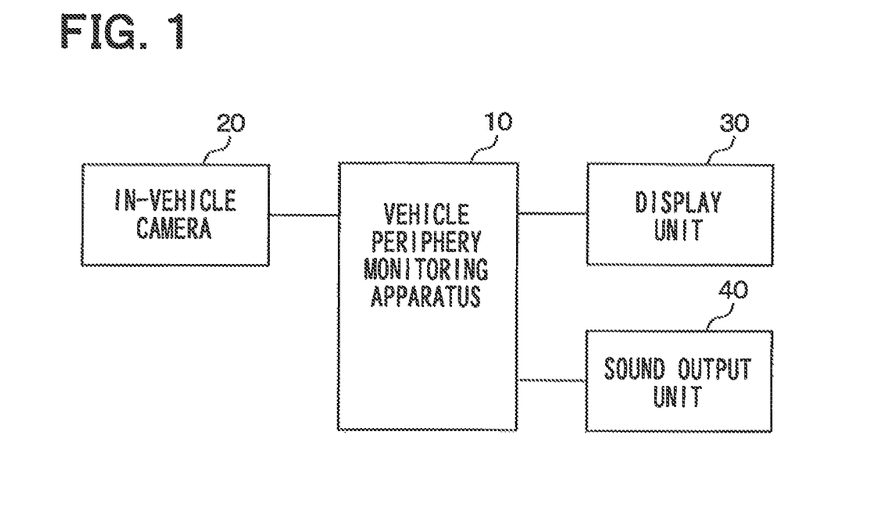
FIG. 1 is a block diagram of a vehicle periphery monitoring apparatus of the present disclosure.

FIG. 1 shows a configuration block diagram of a vehicle periphery monitoring apparatus 10 in one embodiment of the present disclosure. The vehicle periphery monitoring apparatus 10 is coupled to an in-vehicle camera 20 for capturing a periphery of a subject vehicle, a display unit 30 and a sound output unit 40 respectively connected thereto.

The vehicle periphery monitoring apparatus 10 is devised as a vehicle periphery image display apparatus coupled to the existing components, i.e., the in-vehicle camera 20, the display unit 30 and the sound output unit 40, with a detection function of detecting a moving object around the subject vehicle and notifying the vehicle occupant of the moving object detected.

The vehicle periphery monitoring apparatus 10 is implemented as a computer, including CPU, ROM, RAM, EEPROM, I/O and the like. The CPU of the vehicle periphery monitoring apparatus 10 performs various processes according to a program stored by the ROM.

The in-vehicle camera 20 is installed in the vehicle as a rear-view camera capturing an image of a rear view of the subject vehicle. The in-vehicle camera 20 has a wide-angle lens with, for example, an angle range of 185 degrees, 300,000 pixels in one frame of the captured image, and a frame rate of 30 frames per second (fps).

The display unit 30 has a display unit, such as a liquid crystal device, and displays an image on such display unit according to a video signal from the vehicle periphery monitoring apparatus 10.

The sound output unit 40 outputs a sound/voice according to a voice signal from the vehicle periphery monitoring apparatus 10.

The vehicle periphery monitoring apparatus 10 outputs an image signal to display a captured image from the in-vehicle camera 20 to the display unit 30. When the vehicle periphery monitoring apparatus 10 detects a moving object included in the captured image, it outputs an image signal to the display unit 30, to display an image that indicates the detection of the moving object, and outputs a voice signal to the sound output unit 40 for notifying the detection of the moving object, The EEPROM of the vehicle periphery monitoring apparatus 10 stores a parameter table, which defines a parameter representing pixels having brightness change on a detection line at a time of movement of the moving object.

Figure 2:
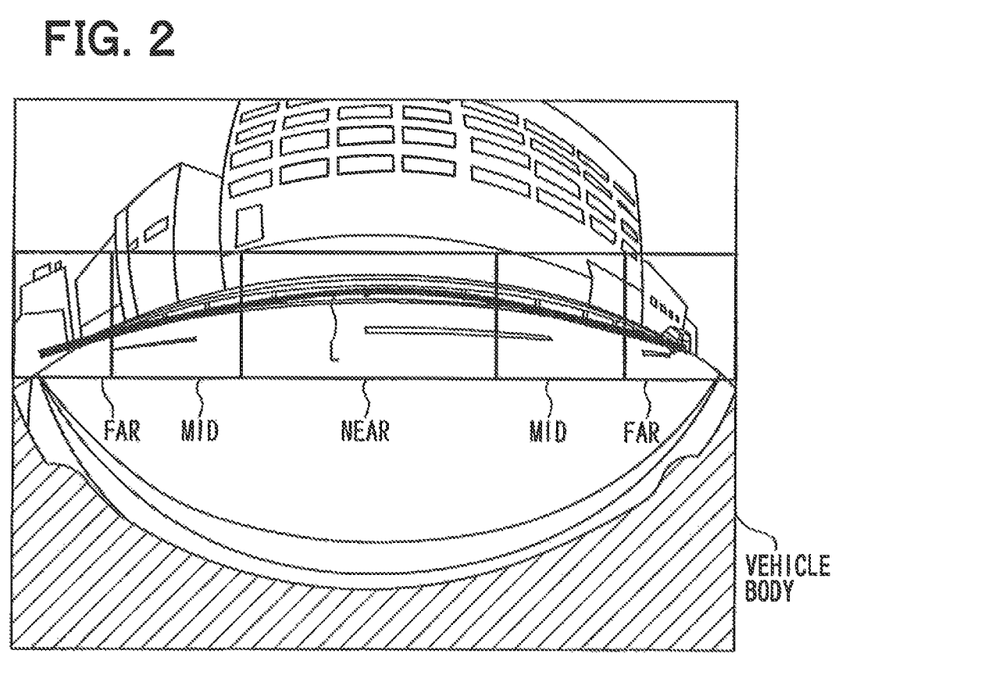
FIG. 2 is an illustration of a detection line set in a captured image by the vehicle periphery monitoring apparatus.

With reference to FIG. 2, the vehicle periphery monitoring apparatus 10 sets a detection line L extending along a right-to-left axis in the captured image, and detects the brightness change of the pixel along the detection line L. The apparatus 10 performs a process that detects the moving object based on (i) the brightness change of the pixel along the detection line L (i.e., actual brightness change of the pixel) and (ii) a predefined brightness change of a pixel along the detection line L, which is defined by the parameter stored in the EEPROM. The width of the detection line L in the present embodiment is set as a width of one pixel in a lengthwise direction of the captured image, and the parameter representing the predefined brightness change of the pixel along the detection line L is also set as a width of such pixel as one pixel.

Figure 3:
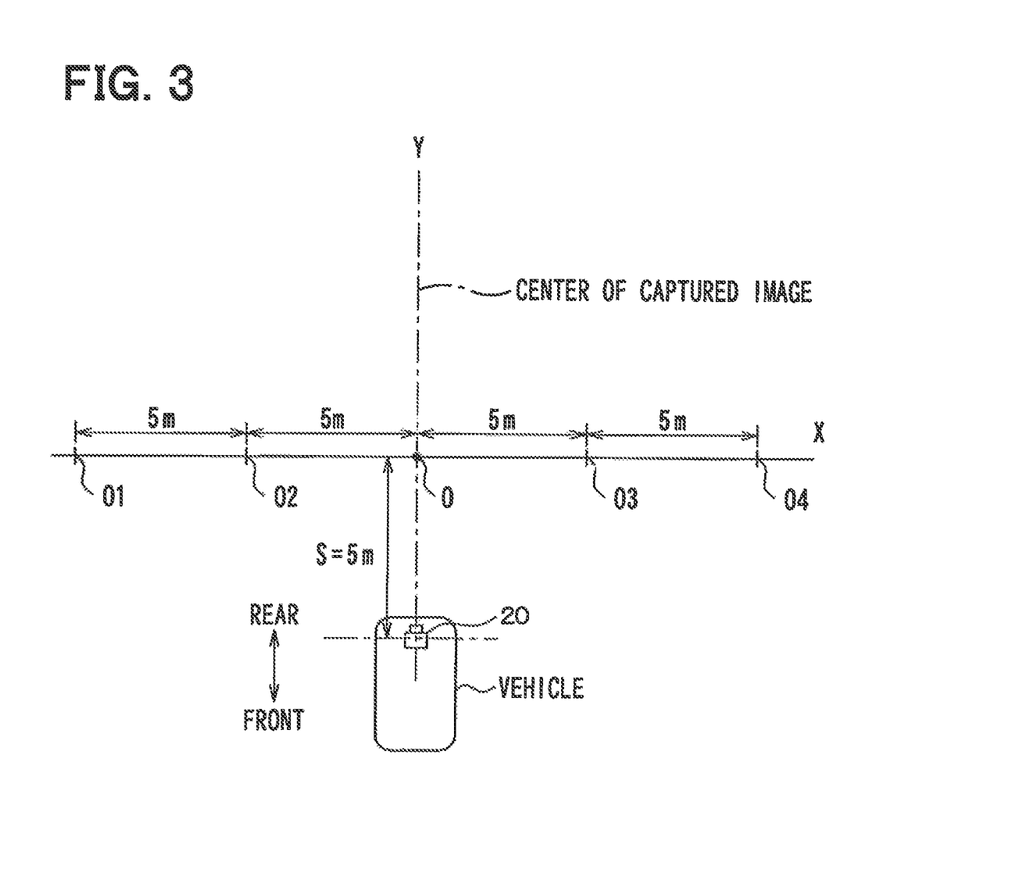
FIG. 3 is an illustration of a vehicle with an in-vehicle camera in a downward view.

FIG. 3 shows an illustration of the vehicle having the in-vehicle camera 20 from a top view looking down. A reference position O is located at a distance (S) of 5 meters from the in-vehicle camera 20 behind the subject vehicle (S=5 m). Four spots O1 to O4 are positioned along a line (i.e., X-axis) that is perpendicular to a vehicle's longitudinal axis (i.e., Y-axis) (i.e., a vehicle's rear view direction toward the position O, in which direction the in-vehicle camera 20 is aligned). The y-axis may be referred to as a camera-to-reference-position direction in claims, which is perpendicular to the line provided by the four spots.

The detection line L in the present embodiment is positioned on top of the reference position O at the center of the captured image, with the distance to the position O set to be 5 meters, as described above. Further, the detection line L is positioned on top of the four spots O1 to O4, which defines a perpendicular line relative to the vehicle's rear view direction, or the camera view direction of the in-vehicle camera 20, pointing to the reference position O.

In other words, the detection line L is positioned on top of a certain point having a preset distance from the in-vehicle camera 20 at the center of the captured image, defining a virtual line that fails on top of other spots. The other spots in this case respectively have gradually longer distances from the in-vehicle camera 20 as the positions of the other spots shift away from the center toward the right and the left in the captured image.

Figure 4:
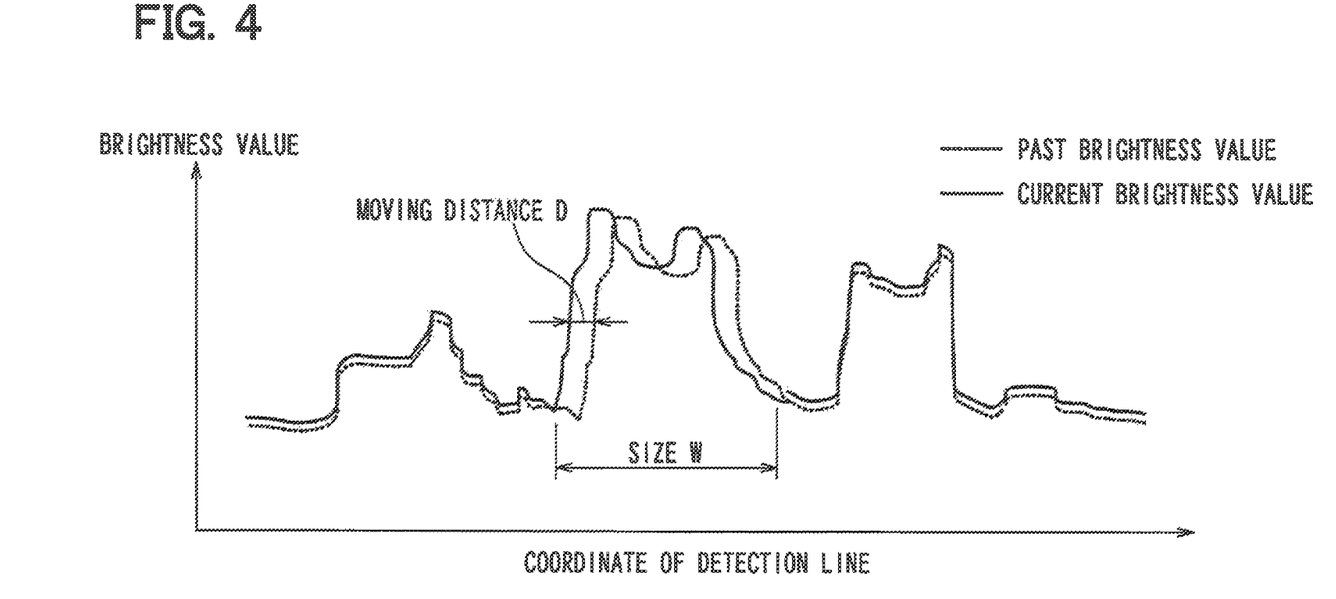
FIG. 4 is a graph of a past and current brightness value of the detection line for detecting a moving object.

With reference to FIG. 4, a detection scheme for detecting the moving object based on the past brightness value and the current brightness value is described. FIG. 4 illustrates an example of the past brightness value of the pixel and the current brightness value of the pixel detected along the detection line L. The horizontal axis of the graph in FIG. 4 represents a coordinate along the detection line L, and the vertical axis of the graph in FIG. 4 represents a brightness value.

As shown in FIG. 4, when a gap is observed between a graph representing the past brightness value and a graph representing the current brightness value, the coordinate of such gap may be considered as the position of the moving object. A width W of the moving object may be calculated as a difference of coordinates for a portion around the gap, and a distance D of a shift of the graph causing such gap is a direction of movement of the moving object. Based on the change of the brightness value, the size and the moving direction of the moving object may be determined.

In the EEPROM of the vehicle periphery monitoring apparatus 10 a parameter is stored. The detection line L extending in the right-left axis is divided into multiple portions according to a distance from the in-vehicle camera 20 to the spots, on which respective portion of the detection line L is laid. A different parameter is used to represent a different portion of the detection line L. The moving object is then detected based on the brightness change of the pixel along the detection line L.

For instance, as shown in FIG. 2, the detection line L is divided into multiple portions such as "Near," "Mid" and "Far" areas. The "Near" area represents a short distance area positioned at the center of the captured image. The "Mid" areas representing two middle distance areas with the "Near" area interposed therebetween, and the "Far" areas representing two long distance areas with the two "Mid" areas and the "Near" area interposed therebetween.

Based on such division of the detection line L according to the "Near" to "Far" areas, the detection of the moving object is performed by (i) the brightness change of the pixel along the detection line L and (ii) the pre-defined brightness change of the pixel for each of the areas of the detection line L as defined by the parameters. In other words, the parametric definition of brightness change of the pixels along the detection line and the actually-detected brightness change of the pixels along the detection line are compared with each other for detecting the moving object.

The parameter defines, as the number of pixels, (i) the amount of pixels that change brightness (e.g., size/width W) and (ii) the amount of movement of the brightness change along the detection line L per unit time (e.g., moving distance D). Further, the parameter is defined in a classified manner for each type of moving objects. For instance, a different parameter is defined for an automobile, a two-wheel vehicle, and a pedestrian.

Figure 5:
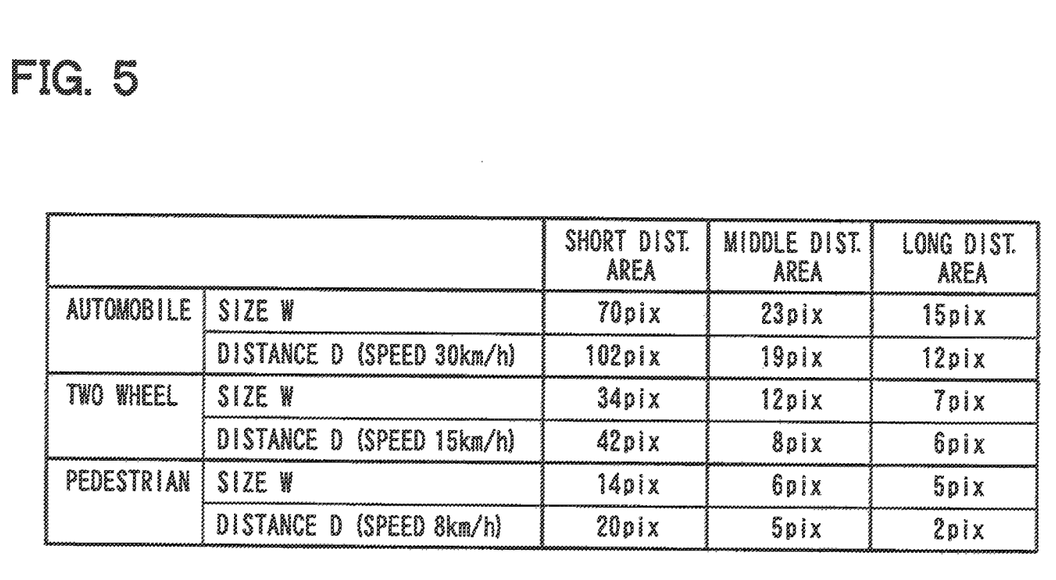
FIG. 5 is a table defining parameters for areas of the detection line.

FIG. 5 shows an example of parameters in the present embodiment. As illustrated, for the short, middle, and long distance areas, each of the moving object types (i.e., automobile/two-wheeler/pedestrian) has parameters regarding the size W and the moving distance D. The size W, which is provided as number of pixels, represents the amount of pixels having a brightness change in the horizontal direction along the detection line L. The moving distance D, which is provided as number of pixels, represents the amount of movement of brightness change per unit time in the horizontal direction along the detection line L.

The size W, which is amount of pixels having a brightness change in the horizontal direction, is defined smaller for the middle distance area than for the short distance area, and is defined to be further smaller for the long distance area than for the middle distance area, for all object types (i.e., automobile/two-wheeler/pedestrian). In other words, W for the short distance area>W for the middle distance area>W for the long distance area (FIG. 5), The moving distance D, the amount of movement of brightness change per unit time, is defined for all object types (i.e., automobile/two-wheeler/pedestrian) to be smaller for the middle distance area than for the short distance area, and is defined to be further smaller for the long distance area than for the middle distance area. In other words, D for the short distance area>D for the middle distance area>D for the long distance area (FIG. 5).

In order to define the amount of movement of the brightness change along the detection line L per unit time, the movement speed of the automobile is assumed to be 30 km/h, the movement speed of the two-wheeler is assumed to be 15 km/h, and the movement speed of the pedestrian is assumed to be 8 km/h. These values may be determined based on samples from an experiment.

The movement speeds of the automobile, the two-wheeler, and the pedestrian need not necessarily match the above values. Therefore, the pixels that may be determined as a moving object are searched for in a predetermined search range. In such search, if the search range is too large, separate moving objects are erroneously detected as the same moving object in some case. Therefore, based on the amount of movement of the brightness change along the detection line L per unit time, the search range is restricted, or is defined not to be too large.

Further, for the improved robustness against the noise or the like of the in-vehicle camera 20, the proximity of the pixels already determined as a moving object is excluded from the search range.

Figure 6:
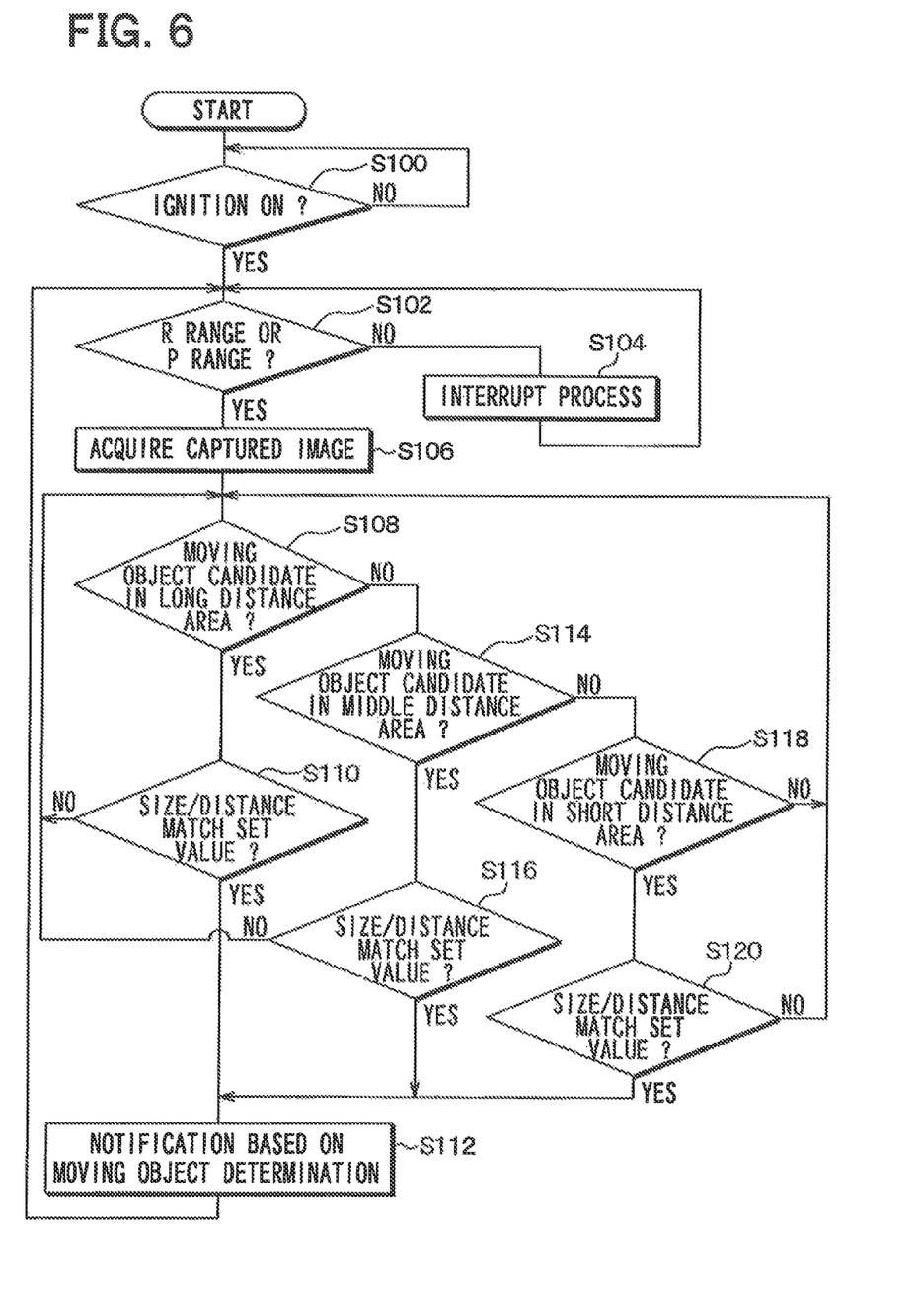
FIG. 6 is a flowchart of a process performed by a CPU of the vehicle periphery monitoring apparatus.

With reference to FIG. 6, the process performed by the CPU of the vehicle periphery monitoring apparatus 10 is described. The CPU of the vehicle periphery monitoring apparatus 10 performs the process periodically.

First, the CPU determines whether an ignition switch of the vehicle is turned to an on state (S100). The CPU repeatedly performs the determination of S100 until the ignition switch of the vehicle is turned to an on state.

When the ignition switch of the vehicle is turned to an on state (S100:YES), the CPU determines whether the position of the shift lever is in a reverse (R) position or in a parking (P) position at S102. In particular, the vehicle periphery monitoring apparatus 10 receives a shift position signal, which indicates a position of the shift lever, and based on the shift position signal, the CPU may make the determination of S102.

If it is determined that the position of the shift lever is in a reverse (R) position or in a parking (P) position based on the shift position signal (S102:YES), the CPU acquires a captured image from the in-vehicle camera 20 at S106.

The CPU then determines whether there is a moving object candidate in the long distance area at S108, and if no moving object candidate is detected (S108:NO), the CPU then determines whether there is a moving object candidate in the middle distance area at S114. If there is no moving object in the middle distance area (S114:NO), the CPU then determines whether there is a moving object candidate in the short distance area at S118.

To determine whether a moving object candidate is located in either of the distance areas, the CPU sets the detection line L extending in the right-left direction in the captured image acquired in S106 and determines the brightness change of the pixels along the detection line L. Specifically, the brightness change of the pixel is based on (a) the brightness of the pixel along the detection line L detected in a previous detection cycle and (b) the brightness of the pixel along the detection line L detected in the current detection cycle.

When it is determined that there is a moving object candidate in the long distance area (S108:YES), the CPU than determines whether the size and the moving distance match a parameter of various types of objects for the long distance area at S110.

For instance, as illustrated in FIG. 5, the CPU determines whether the long distance area has a brightness change of pixels having the size of 15 pixels and a moving distance of 12 pixels, which corresponds to an automobile. Or determines, whether the long distance area has a brightness change having the size of 7 pixels and a moving distance of 6 pixels, which corresponds to a two-wheeler. Or determines, whether long distance area has a brightness change having the size of 5 pixels and a moving distance of 2 pixels, which corresponds to a pedestrian.

In such determination, the number of pixels regarding the size/moving distance has some range of variation. Further, the CPU determines whether the moving object is moving toward the center of the captured image, or is moving from the center of the captured image toward the right or the left.

When it is determined that the size and the moving distance matches the parameter for the long distance area (S110:YES), and the CPU then notifies the presence of the moving object at S112 to the vehicle occupant. For example, when it is determined that an automobile is moving toward the center of the captured image in S110, the CPU controls the display unit 30 to display a message, which may provide "An automobile is coming closer," together with a guidance voice from the sound output unit 40. When it is determined that a pedestrian is moving from the center of the captured image toward the right in S110, the CPU controls the display unit 30 to display a message, which may provide "Watch out for pedestrian," together with a guidance voice from the sound output unit 40, before returning to S102.

When it is determined that there is a moving object candidate in the middle distance area (S114: YES), the CPU determines whether the size and the moving distance match a parameter for the middle distance area at S116.

For instance, as illustrated in FIG. 5, the CPU determines whether the middle distance area has a brightness change of pixels having the size of 23 pixels and a moving distance of 19 pixels, which corresponds to an automobile. Or determines, whether the middle distance area has a brightness change having the size of 12 pixels and a moving distance of 8 pixels, which corresponds to a two-wheeler. Or determines, whether the middle distance area has a brightness change having the size of 6 pixels and a moving distance of 5 pixels, which corresponds to a pedestrian.

In such determination, the number of pixels regarding the size/moving distance has some range of variation. The CPU also determines whether the moving object is moving toward the center of the captured image, or is moving from the center of the captured image toward the right or the left.

When it is determined that there is a moving object in the middle distance area (S116:YES), the CPU notifies the presence of the moving object to the vehicle occupant at S112.

When it is determined that there is a moving object candidate in the short distance area (S118: YES), the CPU determines whether the size and the moving distance match a parameter for the short distance area at S120.

For instance, as illustrated in FIG. 5, the CPU determines whether the short distance area has a brightness change of pixels having the size of 70 pixels and a moving distance of 102 pixels, which corresponds to an automobile. Or determines, whether the short distance area has a brightness change having the size of 34 pixels and the moving distance of 42 pixels, which corresponds to a two-wheeler. Or determines, whether the short distance area has a brightness change having the size of 14 pixels and a moving distance of 20 pixels, which corresponds to a pedestrian.

In such determination, the number of pixels regarding the size/moving distance has some range of variation. Further, the CPU also determines whether the moving object is moving toward the center of the captured image, or is moving from the center of the captured image toward the right or the left.

When it is determined that there is a moving object in the short distance area (S120:YES), the CPU notifies the presence of the moving object at S112 to the vehicle occupant.

Further, when it is determined that there is no moving object candidate in the short distance area (S118:NO) or when it is determined that the size and the moving distance do not match the set value (S120:NO), the CPU returns to S108 without performing notification.

When it is determined that the position of the shift lever is in a position other than a reverse (R) position or a parking (P) position based on the shift position signal (S102:NO), a moving object detection process is interrupted at S104 and the CPU returns to S102.

According to the above configuration, portions of the detection line L positioned in the left area and the right area of the captured image are set to be displayed on top of the far-off spots that are more distant from the in-vehicle camera 20 than a spot on which the center portion of the detection line is displayed. By dividing the detection line into multiple portions according to camera-to-spot distances of respective spots from the in-vehicle camera on which the multiple portions are laid, the parameter table defines a different parameter for each of the divided portions of the detection line. Further, because the moving object is detected based on (i) an actual brightness change of the pixel along the detection line L and (ii) the pre-defined brightness change of the pixel for each of the areas of the detection line L as defined by the parameters (i.e., W and D), the detection of the moving object is performed in an accurate manner.

Further, the detection line is laid/displayed on the reference position O having a known distance from the camera in the center area of the captured image, and the other portions of the detection line are laid/displayed on other spots that define, together with the reference position O, a line extending perpendicularly with reference to a camera view, which points to the reference position O from the vehicle. Therefore, the moving object moving along such perpendicular line is even more accurately detected.

Further, based on the parametric definition of various object sizes as different parameters in the parameter table, a size brightness change of the pixels in the side portions of the detection line L (e.g., the middle and/or long distance areas) is defined smaller than for the pixels at the center portion of the detection line L (e.g., the short distance area). Therefore, the moving object is accurately detected even when the size of the brightness change varies depending on the position of the moving object in the captured image.

For instance, even when the moving object is moving in the captured image from the right/left area of the image toward the center area of the image, or from the center area of the image toward the right/left area of the image, the moving object is accurately detected.

Further, based on the parametric definition of various per-unit-time movement amounts as different parameters in the parameter table, a per-unit-time movement amount of the brightness change of the pixels in the side portions of the detection line (e.g., the middle and/or long distance areas) is defined smaller than for the pixels in the center portion of the detection line (e.g., the short distance area). Therefore, the moving object is accurately detected even when the per-unit-time movement amount of the brightness change varies depending on the position of the moving object in the captured image.

Further, a different parameter is defined for various moving objects, therefore, the type of moving object can also be determined.

Although the present disclosure has been fully described in connection with the preferred embodiment thereof with reference to the accompanying drawings, it is to be noted that various changes and modifications will become apparent to those skilled in the art.

For instance, the in-vehicle camera 20 may have a wide-angle lens as described in the above embodiment, but may also have other types of lens. Further, the field angle, the number of pixels, and the frame rate of the in-vehicle camera 20 may also be changed from the values described in the above embodiment.

Further, the in-vehicle camera 20 described as a rear-view camera in the above embodiment may also be serving as a different type camera for different purposes.

Further, the setting of the detection line L and the reference position in the above embodiment may be changed.

That is, in the above embodiment, the center portion of the detection line L is laid/displayed on top of the reference position having a preset distance from the in-vehicle camera at the center of the captured image, and other portions of the detection line are laid/displayed on top of multiple spots that defines, together with the reference position, a perpendicular line that is perpendicular to a camera-to-reference-position direction, or perpendicular to a camera view direction from the in-vehicle camera toward the reference position.

However, the detection line L may be laid/displayed on top of a certain point having a preset distance from the in-vehicle camera at the center of the captured image, defining a virtual line that falls on top of other spots. The other spots in this case respectively have gradually longer distances from the in-vehicle camera as the positions of the side portions of the detection line laid on the other spots shift away from the center toward the right and the left in the captured image.

Further, the detection line L set as a single line in the above embodiment may be set as multiple lines, defining different distances from the in-vehicle camera.

Further, the parameter table in the above embodiment, defining different parameters respectively for the divided portions of the detection line in areas such as the short/middle/long distance areas, may be differently configured. That is, the number of the areas, and how the detection line is divided into multiple portions may be changed, together with other attributes.

Further, the width of the detection line L and the parameter representing the brightness change of a pixel along the detection line L, respectively set in the above embodiment as a width of one pixel in the lengthwise direction of the captured image, may be changed. That is, the width and the parameter may be set as, for example, a width of three pixels in the lengthwise direction of the captured image.

Such changes and modifications are to be understood as being within the scope of the present disclosure as defined by the appended claims.

Further, the correspondence of the above embodiment to the wording in claims may be, for example, described as S108, S114, S118 respectively corresponding to a detection unit, and S110, S116, S120 respectively corresponding to a moving object detection unit.

What is claimed is:

1. A vehicle periphery monitoring apparatus for monitoring a vehicle periphery comprising:
    a detection unit detecting a brightness change of a pixel along a detection line, the detection line extending in a right-left axis of a captured image captured by an in-vehicle camera, and the brightness change of the pixel being caused by a movement of a moving object;
    a parameter table defining a parameter regarding brightness change being detected along the detection line, as a predefined brightness change of the pixel along the detection line; and
    a moving object detector detecting the moving object, wherein
    the detection line has multiple portions that include a center portion at a center of the captured image and multiple side portions on a right and left side of the center portion, the side portions are positioned on far-off spots farther from the in-vehicle camera relative to a spot on which the center portion is positioned,
    the parameter table defines a different parameter for each of the multiple portions of the detection line,
    the parameter table defines, as the parameter, a size (W) of the predefined brightness change as a number of pixels, and the size of the predefined brightness change is defined smaller for the pixels along the side portions of the detection line than for the pixels along the center portion of the detection line,
    the parameter table defines, as the parameter, a per-unit-time movement amount of the predefined brightness change as a number of pixels (D), and the per-unit-time movement amount of the predefined brightness change is defined smaller for the pixels along the side portions of the detection line than for the pixels along the center portion of the detection line, and
    the moving object detector detects the moving object based on the brightness change of the pixel detected by the detection unit and the predefined brightness change of the pixel defined by the parameter table for the multiple portions of the detection line.

2. The vehicle periphery monitoring apparatus of claim 1, wherein
    the center portion of the detection line is centered at a reference position that has a known distance from the in-vehicle camera, and
    the side portions of the detection line are positioned at other spots, the other spots together with the reference position define a line that is perpendicular to a camera-to-reference-position direction.

3. The vehicle periphery monitoring apparatus of claim 1, wherein
    the parameter table defines parameters for multiple types of moving objects.

4. The vehicle periphery monitoring apparatus of claim 1, wherein
    the parameter table defines different parameters for different types of moving objects.

5. The vehicle periphery monitoring apparatus of claim 4, wherein
    the different types of moving objects includes automobiles, two-wheeled vehicles, and pedestrians.

* * * * *